US011988234B2

(12) United States Patent
O'Konek, Jr. et al.

(10) Patent No.: US 11,988,234 B2
(45) Date of Patent: May 21, 2024

(54) ELECTRONIC PUMP AND METHODS OF USING THE SAME

(71) Applicant: Nott Company, Arden Hills, MN (US)

(72) Inventors: Dusten Carl O'Konek, Jr., Henderson, MN (US); Anthony Reid Hennum, Shakopee, MN (US)

(73) Assignee: Nott Company, Arden Hills, MN (US)

( * ) Notice: Subject to any disclaimer, the term of this patent is extended or adjusted under 35 U.S.C. 154(b) by 0 days.

(21) Appl. No.: 17/845,083

(22) Filed: Jun. 21, 2022

(65) Prior Publication Data

US 2022/0403859 A1 Dec. 22, 2022

Related U.S. Application Data

(60) Provisional application No. 63/213,003, filed on Jun. 21, 2021.

(51) Int. Cl.

| | |
|---|---|
| ***F15B 21/00*** | (2006.01) |
| ***F04B 39/00*** | (2006.01) |
| ***F04B 53/00*** | (2006.01) |
| ***F04B 53/08*** | (2006.01) |
| ***F04B 53/16*** | (2006.01) |

(52) U.S. Cl.

CPC ............ *F15B 21/008* (2013.01); *F04B 53/08* (2013.01); *F04B 53/16* (2013.01); *F04B 39/0027* (2013.01); *F04B 53/002* (2013.01)

(58) Field of Classification Search

CPC ........ F15B 21/008; F04B 53/08; F04B 53/16; F04B 39/0027; F04B 53/002; F04B 17/03; F04B 53/003

See application file for complete search history.

(56) References Cited

U.S. PATENT DOCUMENTS

| | | | | |
|---|---|---|---|---|
| 11,024,278 | B1 * | 6/2021 | Kabakian | G10K 11/168 |
| 2005/0279717 | A1 * | 12/2005 | Larson | C10M 175/04 210/799 |
| 2008/0053746 | A1 * | 3/2008 | Albert | F04D 29/547 181/205 |
| 2014/0363318 | A1 * | 12/2014 | Wang | F04B 53/08 417/366 |
| 2015/0267701 | A1 * | 9/2015 | Pippes | F04C 27/006 417/410.4 |
| 2017/0219083 | A1 * | 8/2017 | Ito | F16H 57/0424 |

FOREIGN PATENT DOCUMENTS

| | | | | |
|---|---|---|---|---|
| DE | 19612582 | A1 * | 10/1997 | B60K 25/02 |
| DE | 102013208455 | A1 * | 11/2014 | F04B 53/002 |
| DE | 102018106496 | A1 * | 9/2019 | B60W 10/08 |

OTHER PUBLICATIONS

DE19612582 translation (Year: 2023).*
DE 102018106496 translation (Year: 2023).*
DE102013208455A1 translation (Year: 2023).*

* cited by examiner

*Primary Examiner* — Charles G Freay
*Assistant Examiner* — David N Brandt

(57) ABSTRACT

The disclosure relates to an electronic pump that can be used in a motor vehicle, particularly for generating hydraulic fluid flow for steering and braking, or to perform auxiliary functions such as dump bodies for garbage trucks or landscape trucks. Methods of operating the system and manufacturing the system are also provided.

20 Claims, 5 Drawing Sheets

ELECTRONIC PUMP AND METHODS OF USING THE SAME

CROSS-REFERENCE TO RELATED APPLICATIONS

This application claims priority to and the benefit of the filing date of U.S. Provisional Patent Application No. 63/213,003, filed Jun. 21, 2021, the entirety of which is hereby incorporated by reference herein.

FIELD OF INVENTION

The disclosure relates to an electronic pump that can be used in a motor vehicle, particularly for generating hydraulic fluid flow for steering and braking, or to perform auxiliary functions such as dump bodies for garbage trucks or landscape trucks. Methods of operating the system and manufacturing the system are also provided.

BACKGROUND

The automobile industry has developed rapidly in recent decades and moved toward electric propulsion in lieu of internal combustion engines. An electronic pump has been required to replace a conventional mechanical pump to provide hydraulic fluid flow for the traditional vehicle operations such as braking and steering, as well as auxiliary functions for vocational vehicles. Use of the electric pump also allows movement towards a safer, more reliable, more stable, fully-automatic and intelligent, and environmental friendly and energy saving trend by allowing closer control of the operation of the unit. The electronic pump has advantages of being efficient and environmental friendly and capable of being adjusted continuously, which can meet the requirements of market well.

SUMMARY OF EMBODIMENTS

The present disclosure provides a system comprising: (a) a motor having an outside periphery and an interior; (b) a hydraulic pump comprising a fluid inlet and a fluid outlet, each of the fluid inlet and fluid outlet in closed fluid communication with one or a plurality of fluid conduits, wherein the one or plurality of fluid conduits define a fluid circuit; (c) a first coolant line defining a fluid pathway for coolant around the motor, wherein a first segment of the first coolant line is positioned along the outside periphery of the motor and a second segment of the first coolant line is positioned along the interior of the motor; and (d) a second coolant line operably connected to the first coolant inlet line and defining a fluid pathway for coolant around the motor, wherein a first segment of the second coolant line is positioned along the interior of the motor and a second segment of the second coolant line is positioned along the outside periphery of the motor, wherein the hydraulic pump and the motor are positioned proximate to or substantially proximate to each other, and wherein the motor is operably electronically connected to at least one cable that carries electricity from an electrical source to the motor.

The disclosure further provides a motor vehicle comprising a system, wherein the system comprises: (a) a motor; (b) a hydraulic pump comprising a fluid inlet and a fluid outlet, each of the fluid inlet and fluid outlet in closed fluid communication with one or a plurality of fluid conduits, wherein one or plurality of conduits define a fluid circuit; (c) a first coolant line defining a fluid pathway for coolant around the motor, wherein a first segment of the first coolant line is positioned along the outside periphery of the motor and a second segment of the first coolant line is positioned along the interior of the motor; and (d) a second coolant line operably connected to the first coolant line and defining a fluid pathway for coolant around the motor, wherein a first segment of the coolant line is positioned along the interior of the motor and a second segment of the second coolant line is positioned along the outside periphery of the motor, wherein the hydraulic pump and the motor are positioned proximate to or substantially proximate to each other; and wherein the motor is operably electronically connected to at least one cable that carries electricity from an electrical source to the motor.

In some embodiments, the first or second coolant line in the disclosed system or the system comprised in the disclosed motor vehicle comprises at least one segment that runs along a longitudinal axis of the motor. In some embodiments, the first or second coolant line comprises at least one segment that runs along a longitudinal axis of the hydraulic pump.

In some embodiments, the disclosed system or the system comprised in the disclosed motor vehicle further comprises a container, which encloses the motor and the hydraulic pump, wherein the first and second coolant lines extend away from the motor and pump and are operably connected to coolant bulkhead fittings positioned within at least one sidewall of the container. In some embodiments, the container is a cylindrical or rectangular based prism, cuboid or parallelepiped. In some embodiments, the container comprises at least three, at least four, at least five, or at least six surfaces 32 defining an interior volume 34. In some embodiments, the container comprises at least six surfaces, two of which are laterally facing surfaces 36 and are parallel sidewalls. In some embodiments, at least one surface 38 of the container is movable, such that the movable surface allows access to and from the interior volume. In some embodiments, at least one surface of the two lateral surfaces of the container is movable, such that the movable surface allows access to and from the interior volume. In some embodiments, the movable surface of the container is movable about at least one edge on the container, such that the movable surface moves radially downward or upward about the at least one edge. In some embodiments, the container comprises fiberglass, plastic, or metal. In some embodiments, the container is from about 12 inches in length, about 12 inches in width, and about 24 inches in height. In some embodiments, the container is from about 8 inches in height, width and length to about 36 inches in height, width and length.

In some embodiments, the motor of the disclosed system is cylindrically shaped. In some embodiments, the motor comprises at least one internal component and rotates internally about a longitudinal axis. In some embodiments, the first and/or second coolant lines are positioned parallel to the longitudinal axis of the motor along a line adjacent to the circumference of the motor. In some embodiments, the motor is cylindrically shaped with two oppositely facing sides, In some embodiments, the first and second coolant lines are proximate to one of the oppositely facing sides of the motor. In some embodiments, the hydraulic pump is positioned adjacent to or substantially adjacent to the other oppositely facing sides.

In some embodiments, the hydraulic pump of the disclosed system or the system comprised in the disclosed motor vehicle is positioned physically adjacent to the motor but are free of operable contact.

In some embodiments, the disclosed system or the system comprised in the disclosed motor vehicle further comprises an insulating material wrapping around the motor and the hydraulic pump, wherein the insulating material comprises a sound absorption coefficient (also called noise-reduction coefficient or NRC) of from about 0.3 to about 1.0.

In some embodiments, the disclosed system or the system comprised in the disclosed motor vehicle operates at no more than about 220 degrees Fahrenheit. In some embodiments, the disclosed system or the system comprised in the disclosed motor vehicle operates from about 140 to about 220 degrees Fahrenheit.

In some embodiments, the disclosed system or the system comprised in the disclosed motor vehicle further comprises a controller operably linked to the motor and the hydraulic pump and a coolant reservoir. In some embodiments, the one or plurality of conduits comprises the fluid reservoir. In some embodiments, the fluid reservoir is outside of the container. In some embodiments, the fluid reservoir is distal to the container from the hydraulic pump. In some embodiments, the one or plurality of conduits comprise one or a combination of steering hydraulic components, transmission components, or suspension components. In some embodiments, the one or plurality of conduits comprises one or a combination of steering hydraulic components, transmission components, a fluid reservoir, or suspension components. In some embodiments, the disclosed system or the system comprised in the disclosed motor vehicle further comprises an inverter in operable connection to the motor through one or a plurality of cables or wires.

Also provided is a method of operating the disclosed system that comprises a controller operably linked to the motor and the hydraulic pump and a coolant reservoir, the method comprising engaging the controller to circulate coolant within the first and second coolant lines. In some embodiments, the controller engages the fluid communication through one or more of the fluid inlet and fluid outlet to increase or decrease the amount of fluid in the fluid reservoir and/or to increase, decrease, and/or optimize the fluid volume in the fluid circuit. In some embodiments, the fluid comprises one or a combination of oil, power steering fluid, power brake fluid, or transmission fluid. In some embodiments, the controller regulates the rate of fluid-flow through the pump over time. In some embodiments, the rate of fluid-flow is accelerated or decelerated by the controller. In some embodiments, the rate of fluid-flow is continuously controlled over time by the controller. In some embodiments, the rate of fluid-flow is maintained at a constant rate of flow or substantially constant. In some embodiments, the method further comprises turning on the motor and/or hydraulic pump.

The disclosure further provides a method of manufacturing any of the disclosed systems, the method comprising affixing the first and second coolant lines to the motor. The disclosure also provides a method of manufacturing any of the disclosed motor vehicle, the method comprising installing any of the disclosed systems into the motor vehicle.

BRIEF DESCRIPTION OF DRAWINGS

The invention will now be described, by way of example, with reference to the accompanying drawings in which.

DETAILED DESCRIPTION OF EMBODIMENTS

Figure 1:
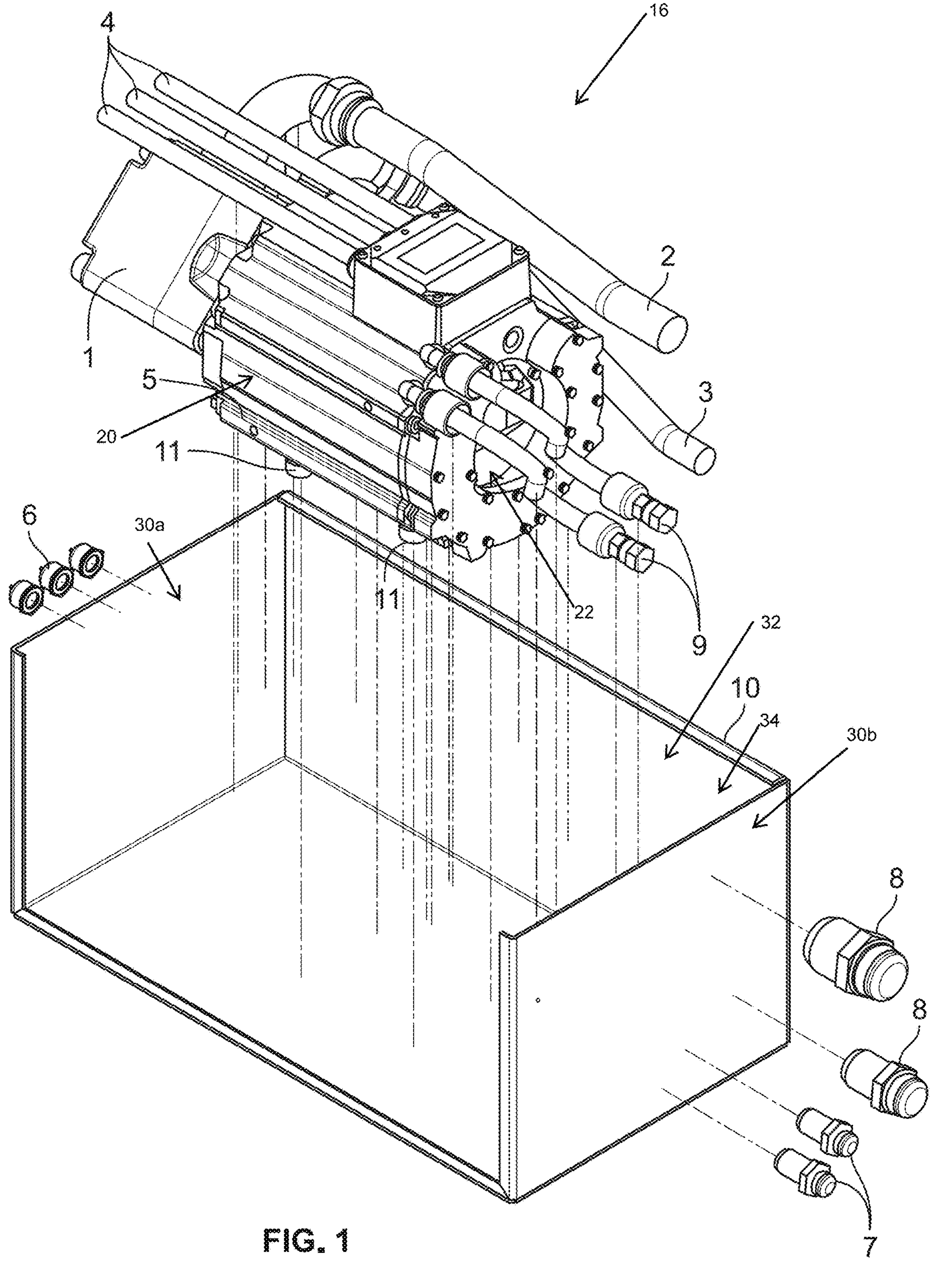
FIG. 1 is schematic view showing the structure of an embodiment of an electronic pump according to the disclosure, a container for the electronic pump, and the bulkhead fittings for affixing the system inside the container.

Before the present systems and methods are described, it is to be understood that the present disclosure is not limited to the particular processes, compositions, or methodologies described, as these may vary. It is also to be understood that the terminology used in the description is for the purposes of describing the particular versions or embodiments only, and is not intended to limit the scope of the present disclosure. Unless defined otherwise, all technical and scientific terms used herein have the same meanings as commonly understood by one of ordinary skill in the art. Although any methods and materials similar or equivalent to those described herein can be used in the practice or testing of embodiments of the present disclosure, the methods, devices, and materials in some embodiments are now described. All publications mentioned herein are incorporated by reference in their entirety. Nothing herein is to be construed as an admission that the present disclosure is not entitled to antedate such disclosure by virtue of prior invention.

Definitions

Unless otherwise defined herein, scientific and technical terms used in connection with the present disclosure shall have the meanings that are commonly understood by those of ordinary skill in the art. The meaning and scope of the terms should be clear, however, in the event of any latent ambiguity, definitions provided herein take precedent over any dictionary or extrinsic definition. Further, unless otherwise required by context, singular terms shall include pluralities and plural terms shall include the singular.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, "either," "one of," "only one of," or "exactly one of." "Consisting essentially of," when used in the claims, shall have its ordinary meaning as used in the field of patent law.

The term "about" is used herein to mean within the typical ranges of tolerances in the art. For example, "about" can be understood as about 2 standard deviations from the mean. According to certain embodiments, when referring to a measurable value such as an amount and the like, "about" is meant to encompass variations of ±20%, ±10%, ±5%, ±1%, ±0.9%, ±0.8%, ±0.7%, ±0.6%, ±0.5%, ±0.4%, ±0.3%, ±0.2% or ±0.1% from the specified value as such variations are appropriate to perform the disclosed methods. When "about" is present before a series of numbers or a range, it is understood that "about" can modify each of the numbers in the series or range.

The term "at least" prior to a number or series of numbers (e.g. "at least two") is understood to include the number adjacent to the term "at least," and all subsequent numbers or integers that could logically be included, as clear from context. When "at least" is present before a series of numbers or a range, it is understood that "at least" can modify each of the numbers in the series or range. Ranges provided herein are understood to include all individual integer values and all subranges within the ranges.

As used herein, the terms "comprising" (and any form of comprising, such as "comprise," "comprises," and "comprised"), "having" (and any form of having, such as "have" and "has"), "including" (and any form of including, such as "includes" and "include"), or "containing" (and any form of containing, such as "contains" and "contain"), are inclusive or open-ended and do not exclude additional, unrecited elements or method steps.

Systems

The disclosure relates to a system 16, particularly an electronic pump, which can be used in a motor vehicle 18 (FIG. 5) as part of the hydraulic system. Reference is made to FIG. 1 which shows a schematic view of an embodiment of such an electronic pump. In the system 16 shown in FIG. 1, the hydraulic pump (1) is positioned on the left-hand side of an electric motor (5), such as a Parker GVM motor. The hydraulic pump (1) comprises a fluid inlet (2) and a fluid outlet (3). Each of the fluid inlet (2) and fluid outlet (3) is in closed fluid communication with one or a plurality of fluid conduits, which defines a fluid circuit. In some embodiments, each of the fluid inlet (2) and fluid outlet (3) comprises hose and tube. In some embodiments, each of the fluid inlet (2) and fluid outlet (3) further comprise one or a plurality of fittings, such as bulkhead fittings. Any type of hydraulic pump can be used in the disclosed system, which includes but not limited to rotary vane pump, gear pump, screw pump, bent axis pump, inline axial piston pump and radial piston pumps. In some embodiments, the hydraulic pump in the disclosed system is a rotary vane pump, as shown in FIG. 1. In some embodiments, the hydraulic pump in the disclosed system is a gear pump. In some embodiments, the hydraulic pump in the disclosed system is a screw pump. In some embodiments, the hydraulic pump in the disclosed system is a bent axis pump. In some embodiments, the hydraulic pump in the disclosed system is an inline axial piston pump. In some embodiments, the hydraulic pump in the disclosed system is a radial piston pumps.

The system shown in FIG. 1 further comprises a plurality of coolant lines (9). For example, the system can comprise a first second coolant lines (9*a,b*). Each of the first and the second coolant lines (9*a,b*) comprises hose and tube. In some embodiments, each coolant line further comprises one or a plurality of fittings, such as bulkhead fittings. In some embodiments, the first coolant line defines a fluid pathway for coolant around the motor, wherein a first segment of this first coolant line is positioned along an outside periphery 20 of the motor and a second segment of this first coolant line is positioned along an interior 22 of the motor (5). In some embodiments, the second coolant line is operably connected to the first coolant line and defines a fluid pathway for coolant around the motor, wherein a first segment of this second coolant line is positioned along the interior of the motor and a second segment of this second coolant line is positioned along the outside periphery of the motor.

In some embodiments, the first coolant line 9*a* comprises at least one segment that runs along a longitudinal axis 40 of the motor. In other embodiments, the second coolant line comprises at least one segment that runs along a longitudinal axis of the motor. In some embodiments, the first coolant line comprises at least one segment that runs along a longitudinal axis of the hydraulic pump 42. In other embodiments, the second coolant line comprises at least one segment that runs along a longitudinal axis of the hydraulic pump.

Figure 2:
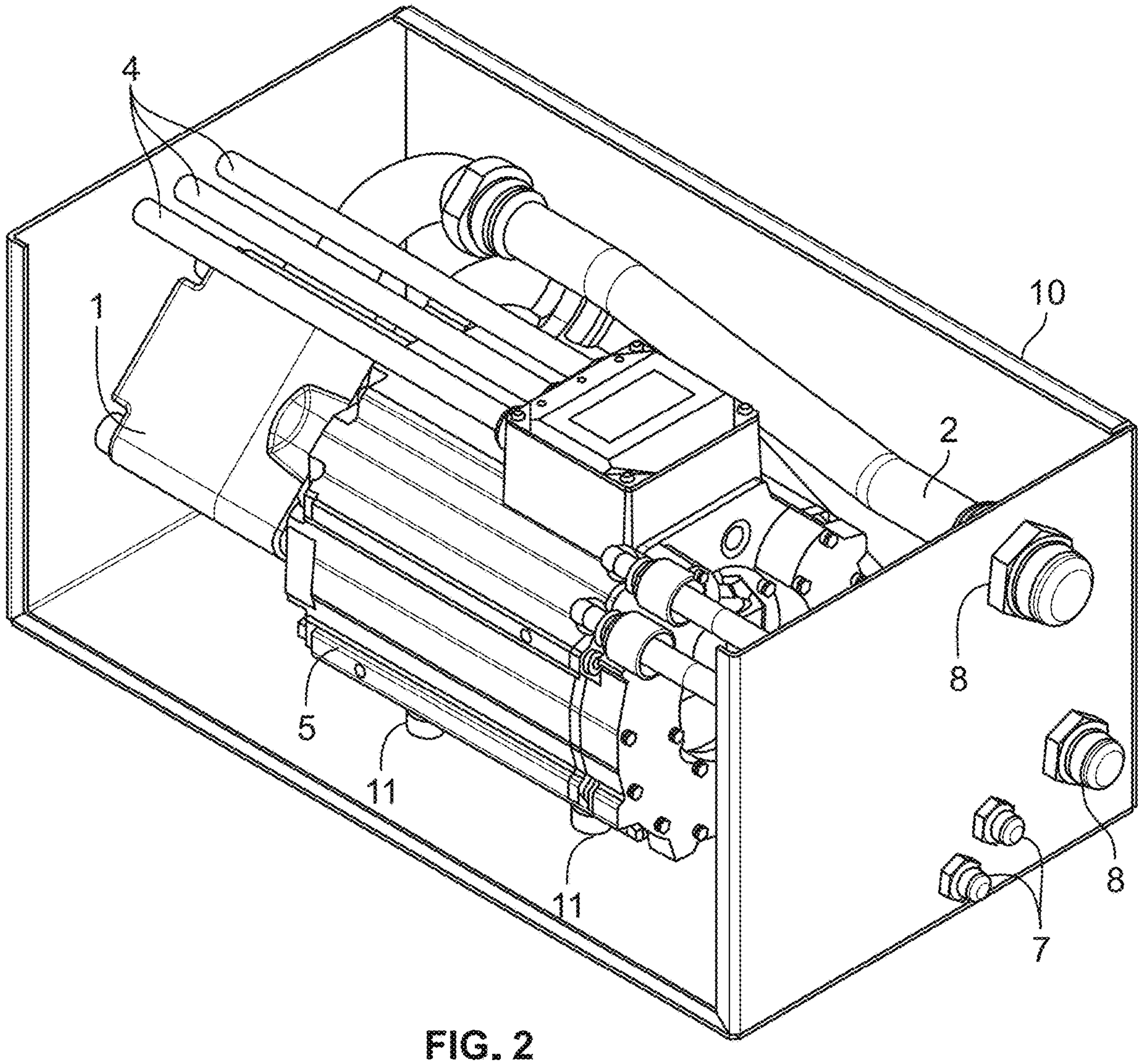
FIG. 2 is a schematic view showing the electronic pump in FIG. 1 affixed within the container.
Figure 3:
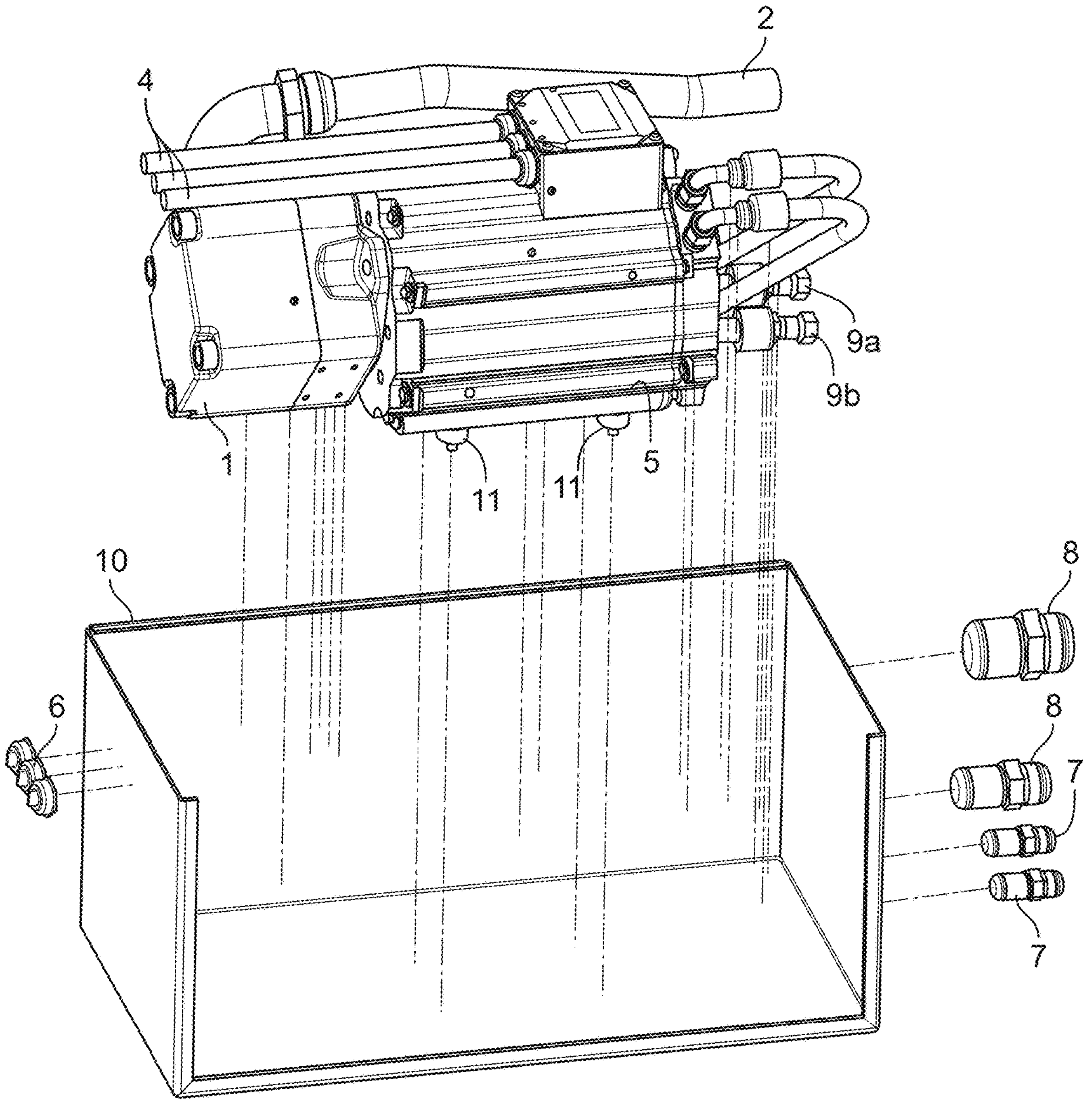
FIG. 3 is a schematic view from a different angle showing the structure of the electronic pump in FIG. 1.
Figure 4:
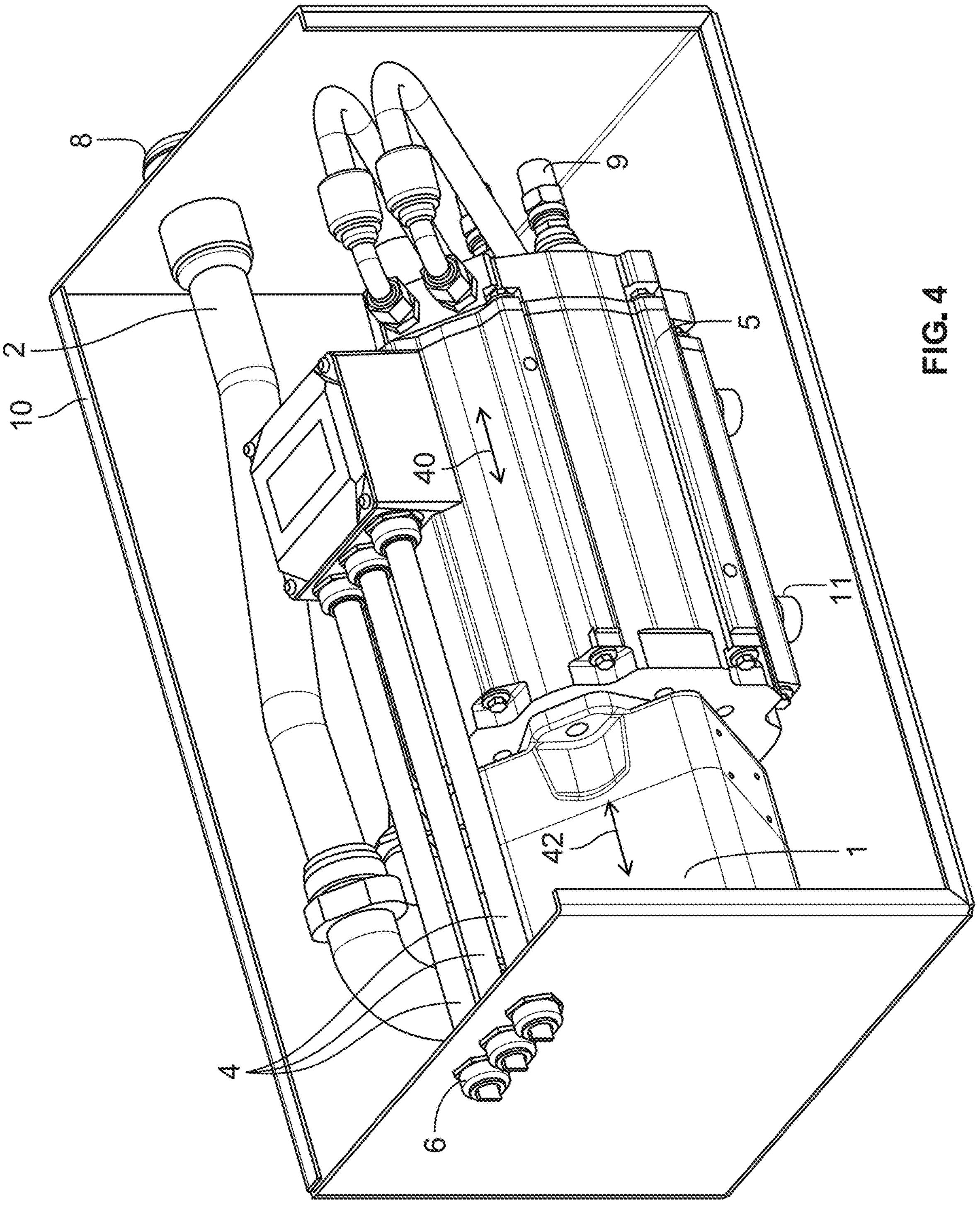
FIG. 4 is schematic view showing the electronic pump in FIG. 3 affixed within the container.

The system shown in FIG. 1 also comprises three electrical cables (4) connecting the electric motor to an inverter (not shown). Also shown in FIG. 1 is a container (10) within which the system can be affixed. When the system is affixed in the container (10), the electrical cables (4) are operably connected to electrical bulkhead connections (6) positioned within a first sidewall (30*a*) of the container (10), and the first and second coolant lines (9*a,b*) extend away from the motor (5) and hydraulic pump (1) and are operably connected to coolant bulkhead fittings (7) positioned within a second sidewall (30*b*) of the container (10) that is opposite from the first sidewall. In such embodiments, the fluid inlet (2) and the fluid outlet (3) of the hydraulic pump (1) are operably connected to hydraulic bulkhead fittings (8) also positioned within the second sidewall (30*b*) of the container (10). Any type of electrical bulkhead connections can be used. In some embodiments, electrical bulkhead connections used in the disclosed system are the compression type that are liquid tight and allow the electrical cables (4) to pass through intact. Any type of coolant bulkhead fittings and hydraulic bulkhead fittings can be used. The container (10) can be made of any suitable materials, such as fiberglass, plastic or metal, or any combination thereof. In some embodiments, the container (10) comprises metal. In some embodiments, the container (10) comprises fiberglass. In some embodiments, the container (10) comprises plastic. A schematic view of a system according to the disclosure affixed within a container is shown in FIG. 2 and FIG. 4.

In some embodiments, the disclosed system further comprises one or a plurality of vibration isolators (11), which is illustrated in FIGS. 1-4. The vibration isolators minimize vibration and noise from machinery to reduce maintenance costs, prolong equipment life, and protect floors. Any type of vibration isolators can be used, such as those provided in www.mcmaster.com/vibration-isolators/fail-safe-bolt-down-vibration-damping-mounts-with-threaded-hole/.

As shown in FIG. 1, the motor (5) of the disclosed system is cylindrically shaped in some embodiments. In some embodiments, an internal component of the motor (5) rotates internally about a longitudinal axis, and the first and/or second coolant lines (9) are positioned parallel to the longitudinal axis of the motor (5) along a line adjacent to a circumference of the motor (5). In some embodiments, the motor (5) is cylindrically shaped with two oppositely facing sides and rotates internally about a longitudinal axis, and the first and second coolant lines (9) are proximate to one of the oppositely facing sides of the motor (5), and the hydraulic pump (1) is positioned adjacent to or substantially adjacent to the other oppositely facing sides. As shown in FIG. 1, in some embodiments, the hydraulic pump (1) is positioned physically adjacent to the motor (5), but the hydraulic pump and motor are free of operable contact.

In some embodiments where the system is affixed in a container, the container can be of any dimension. In some embodiments, the container is from about 8 inches in height to about 36 inches in height. In some embodiments, the container is from about 8 inches in width to about 36 inches in width. In some embodiments, the container is from about 8 inches in length to about 36 inches in length. In some embodiments, the container is from about 12 inches in length, about 12 inches in width, and about 24 inches in height.

In some embodiments, the system operates at no more than about 220 degrees Fahrenheit. In some embodiments, the system operates at no more than about 210 degrees Fahrenheit. In some embodiments, the system operates at no more than about 200 degrees Fahrenheit. In some embodiments, the system operates at no more than about 190 degrees Fahrenheit. In some embodiments, the system operates at no more than about 180 degrees Fahrenheit. In some embodiments, the system operates at no more than about 170 degrees Fahrenheit. In some embodiments, the system operates at no more than about 160 degrees Fahrenheit. In some embodiments, the system operates at no more than about 150 degrees Fahrenheit. In some embodiments, the system operates at no more than about 140 degrees Fahrenheit. In some embodiments, the system operates at no more than about 130 degrees Fahrenheit. In some embodiments, the system operates at no more than about 120 degrees Fahrenheit.

In some embodiments, the system operates from about 120 to about 220 degrees Fahrenheit. In some embodiments, the system operates from about 130 to about 210 degrees Fahrenheit. In some embodiments, the system operates from about 140 to about 200 degrees Fahrenheit. In some embodiments, the system operates from about 150 to about 190 degrees Fahrenheit. In some embodiments, the system operates from about 160 to about 180 degrees Fahrenheit. In some embodiments, the system operates from about 140 to about 220 degrees Fahrenheit.

In some embodiments, the system of the disclosure further comprises an insulating material wrapping around the motor and the hydraulic pump. In some embodiments, the insulating material comprises a sound absorption coefficient (also called noise-reduction coefficient or NRC) of from about 0.3 to about 1.0. In some embodiments, the insulating material comprises a sound absorption coefficient of from about 0.4 to about 1.0. In some embodiments, the insulating material comprises a sound absorption coefficient of from about 0.5 to about 1.0. In some embodiments, the insulating material comprises a sound absorption coefficient of from about 0.6 to about 1.0. In some embodiments, the insulating material comprises a sound absorption coefficient of from about 0.7 to about 1.0. In some embodiments, the insulating material comprises a sound absorption coefficient of from about 0.75 to about 1.0. In some embodiments, the insulating material comprises a sound absorption coefficient of from about 0.8 to about 1.0. In some embodiments, the insulating material comprises a sound absorption coefficient of from about 0.85 to about 1.0. In some embodiments, the insulating material comprises a sound absorption coefficient of from about 0.9 to about 1.0.

In some embodiments, the insulating material comprises a sound absorption coefficient of about 0.3. In some embodiments, the insulating material comprises a sound absorption coefficient of about 0.4. In some embodiments, the insulating material comprises a sound absorption coefficient of about 0.5. In some embodiments, the insulating material comprises a sound absorption coefficient of about 0.6. In some embodiments, the insulating material comprises a sound absorption coefficient of about 0.7. In some embodiments, the insulating material comprises a sound absorption coefficient of about 0.75. In some embodiments, the insulating material comprises a sound absorption coefficient of about 0.8. In some embodiments, the insulating material comprises a sound absorption coefficient of about 0.85. In some embodiments, the insulating material comprises a sound absorption coefficient of about 0.9. In some embodiments, the insulating material comprises a sound absorption coefficient of about 0.95. In some embodiments, the insulating material comprises a sound absorption coefficient of about 1.0.

In some embodiments, the insulating material comprises a sound absorption coefficient greater than about 0.5. In some embodiments, the insulating material comprises a sound absorption coefficient greater than about 0.6. In some embodiments, the insulating material comprises a sound absorption coefficient greater than about 0.7. In some embodiments, the insulating material comprises a sound absorption coefficient greater than about 0.75. In some embodiments, the insulating material comprises a sound absorption coefficient greater than about 0.8. In some embodiments, the insulating material comprises a sound absorption coefficient greater than about 0.85. In some embodiments, the insulating material comprises a sound absorption coefficient greater than about 0.9.

In some embodiments, the insulating material comprises a fiber and a binding agent. In some embodiments, the fiber comprises one or a combination of fiberglass, mineral wool, or ceramic fiber. In some embodiments, the binding agent comprises one or a combination of a resin or polymer. In some embodiments, the polymer comprises one or a combination of a terpolymer or quarterpolymer. In some embodiments, the insulating material is fabric or textile in the form of a blanket, bat insulation, or board. In some embodiments, the insulating material covers at least one surface of a container enclosing the pump, a container enclosing the system, a container enclosing the motor. In some embodiments, the insulating material covers a surface of the container that is the internal surface and in some embodiments, the insulating material covers a surface of the container that is the external surface.

Examples of the insulating material suitable for wrapping around the motor and the hydraulic pump of the disclosure include, but not limited to, polypropylene foam sheets such as water-resistant rigid sound-absorbing sheets by McMaster-Carr (www.mcmaster.com/9107T12/), acrylic plastic and butyl rubber sheets such as vibration damping sheet by McMaster-Carr (www.mcmaster.com/9709T29/), polyurethane foam sheets such as vibration damping sheet by McMaster-Carr (www.mcmaster.com/9709T72/), butyl and aluminum constrained-layer vibrational dampers by Dynamat Inc. (www.dynamat.com/wp-content/uploads/

2021/02/2010-Dynamat-Xtreme-Sell-Sheet_Web.pdf), QUIET BARRIER™ HD (w/PSA) soundproofing material sheets by Soundproof Cow Corporate (https://www.soundproofcow.com/product/quiet-barrier%c2%ad-hd-soundproofing-material-sheet-psa/), QUIET BATT™ 30 Soundproofing Insulation by Soundproof Cow Corporate (https://www.soundproofcow.com/product/quiet-batt-30-soundproofing-insulation/), mineral wool insulation materials such as THERMAFIBER® SAFB™ (Sound Attenuation Fire Blanket) by Owens Corning (www.owenscorning.com/en-us/insulation/products/thermafiber-safb-sound-attenuation-fire-blanket), SELECTSOUND® Black Acoustic Blanket by Owens Corning (www.owenscorning.com/en-us/insulation/products/selectsound-black-acoustic-blanket), and a combination of any of such materials.

In some embodiments, the system of the disclosure can further comprise a controller operably linked to the motor and the hydraulic pump and a coolant reservoir. In some embodiments, the coolant reservoir is at a position distal from the container enclosing the motor. In other embodiments, the system of the disclosure can further comprise an inverter in operable connection to the motor through one or a plurality of cables or wires.

In some embodiments, the system is affixed to a motor vehicle by a connector. In some embodiments the container is affixed to the motor vehicle by a connector. In some embodiments, the connector comprises one or both of a vibration isolator (11) or a connecting element. In some embodiments, the connecting element passes through the vibration isolator. In some embodiments, the vibration isolator is positioned between the container and one or both of the electric motor or hydraulic pump. In some embodiments, the connecting element passes through at least one surface of the container to affix the electric motor and/or hydraulic pump to the motor vehicle. In some embodiments, the connecting element comprises one or a combination of a nail, a screw, a fastener, a rivet, a bolt, a nut, or a tie.

Figure 5:
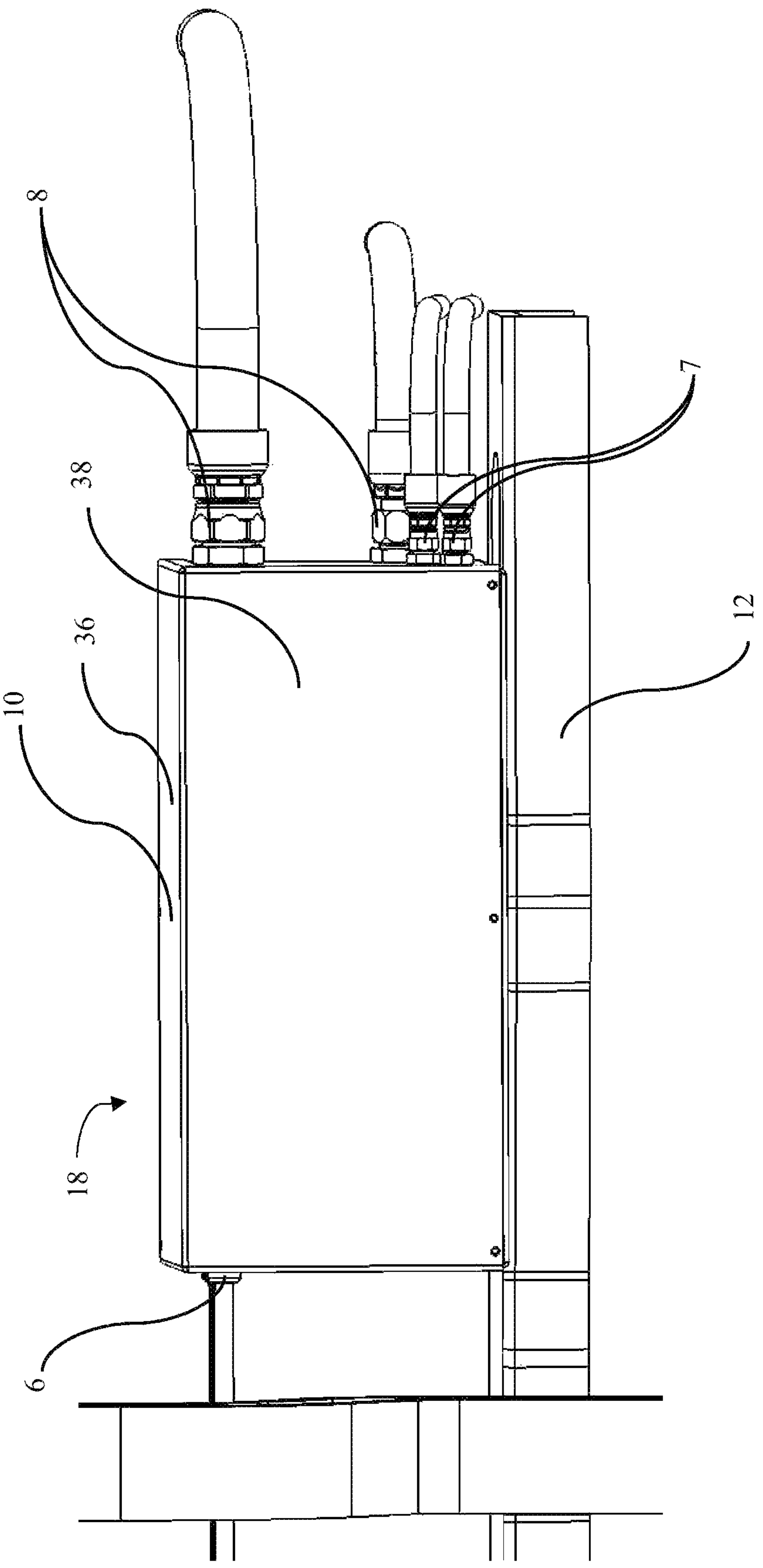
FIG. 5 is a schematic view showing a motor vehicle incorporating an embodiment of an electronic pump according to the present disclosure.

The system of the disclosure is suitable for incorporating into a motor vehicle, particularly for generating hydraulic fluid flow for steering and braking, or to perform auxiliary functions such as dump bodies for garbage trucks or landscape trucks. In some embodiments, therefore, the disclosure provides a motor vehicle comprising any of the systems disclosed herein. One of such embodiments is shown in FIG. 5, which a schematic view showing an embodiment of an electronic pump according to the present disclosure attached to a frame of a vehicle. The electronic pump is enclosed in the container (10). The electronic pump is affixed in the container (10) by the electrical bulkhead connections (6), the coolant bulkhead fittings (7), and the hydraulic bulkhead fittings (8).

In some embodiments, a hydraulic pump assembly is provided, the hydraulic pump assembly comprising an electric motor, a hydraulic pump, and electric cable. In some embodiments, the hydraulic pump comprises a first housing, a first interior rotating segment, a fluid inlet, and a fluid outlet. In some embodiments, the fluid outlet and fluid inlet are together capable of being in closed fluid communication with a fluid circuit of motor vehicle; the fluid circuit of the motor vehicle comprising a brake hydraulic system, a steering hydraulic system, or a transmission system. In some embodiments, the first interior rotating segment turns within the first housing and is capable of providing fluid flow to the fluid through the fluid inlet and the fluid outlet.

In some embodiments, the electric motor comprises a second housing, a second interior rotating segment, a first coolant line, and a second coolant line. In some embodiments, the electric motor is cylindrical in shape, having a long axis, and the second interior rotating segment rotating along the long axis within the second housing. In some embodiments, the interior rotating segment is affixed to the first interior rotating segment. In some embodiments, the first coolant line comprises a first segment and a second segment; the first segment being positioned along the outside periphery of the electric motor; and the second segment being positioned along the interior of the motor; the first segment and second segment providing a fluidic pathway for coolant around the motor. In some embodiments, the second coolant line comprises a third segment and a fourth segment; the third segment being positioned along the interior of the motor; the first segment being in fluidic coolant communication with the third segment; the fourth segment being positioned along the outside periphery of the motor; the second segment being in fluidic coolant communication with the second segment. In some embodiments, the third segment comprises a coolant outlet. In some embodiments, the second segment comprises a coolant inlet.

In some embodiments, the second housing or the second interior rotating segment comprise wound electrical conductors, which are in electrical communication with the electric cable and are capable of inducing an electromagnetic field; the electromagnetic field being capable of turning the second interior rotating segment when an electrical potential is provided by the electric cable. In some embodiments, the hydraulic pump assembly further comprises a container; the container comprising a surface, an electrical bulkhead connector, a coolant bulkhead fitting, or a hydraulic bulkhead fitting. In some embodiments, one or a combination of the electrical bulkhead connector, the coolant bulkhead fitting, or the hydraulic bulkhead fitting are affixed to the surface. In some embodiments, the electrical bulkhead connector are connected to the electric cable. In some embodiments, one or a combination of the coolant inlet or coolant outlet is affixed to one or more coolant bulkhead fittings. In some embodiments, one or a combination of the fluid inlet and fluid outlet are affixed to one or more hydraulic bulkhead fittings.

Methods

The disclosure further relates to methods of operating any of the systems disclosed herein. In some embodiments, system comprises a master controller controlling rate of hydraulic fluid through the disclosed circuit. In some embodiments, the master controller comprises a fluid controller and a coolant controller. In some embodiments, the fluid controller and the coolant controller are the same. In some embodiments, such methods further comprise turning on or off the motor. In some embodiments, such methods further comprise turning on or off the hydraulic pump. In some embodiments, such methods further comprise turning on or off both the motor and the hydraulic pump. In some embodiments, the master controller turns on or off the motor. In some embodiments, the master controller turns on or off the hydraulic pump. In some embodiments, in some embodiments, the master controller turns on or off both the motor and the hydraulic pump.

In some embodiments, the system comprises a coolant controller operably linked to the motor and the hydraulic pump and a coolant reservoir, such methods comprise engaging the coolant controller to circulate coolant within one or both of the first and second coolant lines. In some embodiments, the coolant controller regulates an increase or a decrease in the amount of coolant in the coolant reservoir and/or to increase, decrease, and/or optimize the amount of coolant in the one or both of the first and second coolant lines. In some embodiments, the coolant controller is integral to the master controller. In some embodiments, the coolant controller is discrete from the master controller.

In some embodiments, the system further comprises a fluid controller. In some embodiments, the fluid controller engages the fluid communication through one or more of the fluid inlet and fluid outlet to increase or decrease the amount of fluid in the fluid reservoir and/or to increase, decrease, and/or optimize the fluid volume in the fluid circuit. In some embodiments, the fluid comprises one or a combination of oil, power steering fluid, power brake fluid, or transmission fluid. In some embodiments, the fluid controller and/or the master controller controls the rate of fluid flow through the pump over time. In some embodiments, the speed of the pump is accelerated or decelerated by the fluid and/or master controller. In some embodiments, the speed of the pump is continuously controlled over time by the fluid and/or master controller. In some embodiments, the rate of fluid flow through the pump is maintained as constant or substantially constant. In some embodiments, the fluid controller is integral to the master controller. In some embodiments, the fluid controller is discrete from the master controller. In some embodiments, the coolant controller is integral to the fluid controller. In some embodiments, the coolant controller is discrete from the fluid controller.

An operator of the vehicle comprising the disclosed system may select, de-select, or program the rate of fluid flow and/or the rate of coolant flow through one or more monitors or displays in electronic communication with a computer memory and the controller. In some embodiments, the operator of the vehicle comprising the disclosed system may select, de-select, or program the rate of fluid flow and/or the rate of coolant flow through one or more monitors or displays in electronic communication with a computer memory master, fluid, and/or coolant controller via simple wire connection. In some embodiments, the coolant controller increases and/or decreases the rate of flow of coolant based on based on the temperature of the coolant, wherein an increase in the temperature increases the rate of flow of coolant and a decrease in temperature decreases the rate of flow of coolant. In some embodiments, an operator may select, de-select, or program increases or decreases in the rate of flow based on an increase or decrease in the temperature of the coolant (e.g. by increasing the coefficient (i.e. slope of a line) of the relationship between an increase in rate of flow and an increase in temperature or by increasing the set-point (i.e. y- or x-intercept of a line) by which all other increases or decreases in the rate of flow per increase or decrease in degree of temperature are factored).

In some embodiments, the system comprises electrical cables. In some embodiments, the electrical cables are in electrical communication with the electric motor and form a circuit with the battery or plurality of batteries in the vehicle. In some embodiments, the electrical cables are in electrical communication with one or a combination of the master controller, fluid controller, or coolant controller. In some embodiments, the master controller, fluid controller, and coolant controller are in electrical communication with the electric motor. In some embodiments, the electrical cables are in electrical communication with the motor vehicle. In some embodiments, the electrical cables are in electrical communication with the one or a combination of the inverter, battery, or electrical system of the motor vehicle.

The disclosure also provides a method of manufacturing any of the systems disclosed herein comprising affixing the first and second coolant lines to the motor. In some embodiments, the method further comprises affixing the hydraulic pump proximate to or substantially proximate to the motor. In some embodiments, the hydraulic pump is positioned physically adjacent to the motor but are free of operable contact.

The disclosure additionally provides a method of manufacturing a motor vehicle comprising installing any of the systems disclosed herein into a motor vehicle. In some embodiments, the system is enclosed in a container before installing into the motor vehicle. In some embodiments, the system is wrapped in an insulating material and then enclosed in a container. In some embodiments therefore, the disclosure provides a motor vehicle comprising a sound-proofed system disclosed herein as part of the heating management system.

It should be noted that, the above embodiments are only intended for describing the present disclosure, and should not be interpreted as limitation to the technical solutions of the present disclosure. Although the present disclosure is described in detail in conjunction with the above embodiments, it should be understood by the skilled in the art that, modifications or equivalent substitutions may still be made to the present disclosure by those skilled in the art; and any technical solutions and improvements thereof without departing from the spirit and scope of the present disclosure also fall into the scope of the present disclosure defined by the claims.

All referenced journal articles, patents, and other publications are incorporated by reference herein in their entireties.

KEY REFERENCE NUMERALS

1 Hydraulic pump
2 Fluid inlet of the hydraulic pump
3 Fluid outlet of the hydraulic pump
4 Electrical cables
5 Electric motor
6 Electrical bulkhead connections
7 Coolant bulkhead fittings
8 Hydraulic bulkhead fittings
9 Coolant lines
10 Container
11 Vibration isolator

EXEMPLARY ASPECTS

In view of the described products, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A system comprising:

(a) a motor having an outside periphery and an interior;

(b) a hydraulic pump comprising a fluid inlet and a fluid outlet, each of the fluid inlet and fluid outlet in closed fluid communication with one or a plurality of fluid conduits, wherein the one or plurality of fluid conduits define a fluid circuit;

(c) a first coolant line defining a fluid pathway for coolant around the motor, wherein a first segment of the first coolant line is positioned along the outside periphery of the motor and a second segment of the first coolant line is positioned along the interior of the motor; and (d) a second coolant line operably connected to the first coolant line and defining a fluid pathway for coolant around the motor, wherein a first segment of the second coolant line is positioned along the interior of the motor and a second segment of the second coolant line is positioned along the outside periphery of the motor, wherein the hydraulic pump and the motor are positioned proximate to or substantially proximate to each other, and wherein the motor is operably electronically connected to at least one cable that carries electricity from an electrical source to the motor.

Aspect 2: The system of aspect 1, wherein the first or second coolant line comprises at least one segment that runs along a longitudinal axis of the motor.

Aspect 3: The system of aspect 1, wherein the first or second coolant line comprises at least one segment that runs along a longitudinal axis of the hydraulic pump.

Aspect 4: The system of any of aspects 1 through 3, further comprising a container comprising at least one sidewall, a first coolant bulkhead fitting, and a second coolant bulkhead fitting, the container encompassing the motor and the hydraulic pump, and wherein the first and second coolant lines extend away from the motor and pump and are operably connected to coolant bulkhead fittings positioned within the at least one sidewall.

Aspect 5: The system of aspect 4, wherein the container is a cylindrical or rectangular based prism, cuboid, or parallelepiped and comprises one or a plurality of surfaces that define an interior volume.

Aspect 6: The system of aspect 5, wherein the container is a rectangular based prism, cuboid or parallelepiped and comprises six surfaces, which define the interior volume, wherein the two lateral surfaces are parallel sidewalls and at least one surface is movable, such that the movable surface allows access to and from the interior volume.

Aspect 7: The system of aspect 6, wherein the movable surface is movable radially downward or upward about at least one edge on the container.

Aspect 8: The system of any of aspects 4 through 7, wherein the container comprises fiberglass, plastic, or metal.

Aspect 9: The system of aspect 4, wherein the motor is cylindrically shaped and comprises an internal component, capable of rotating internally about the longitudinal axis of the motor, and wherein the first and/or second coolant lines are positioned parallel to the longitudinal axis of the motor along a line adjacent to a circumference of the motor.

Aspect 10: The system of any of aspects 1 through 9, wherein the motor is cylindrically shaped with two oppositely facing sides, wherein the first and second coolant lines are proximate to one of the oppositely facing sides of the motor, and wherein the hydraulic pump is positioned adjacent to or substantially adjacent to the other oppositely facing sides.

Aspect 11: The system of any of aspects 1 through 10, wherein the hydraulic pump is positioned physically adjacent to the motor but the hydraulic pump is free of operable contact with the motor.

Aspect 12: The system of any of aspects 1 through 11, wherein the container is from about 12 inches in length, about 12 inches in width, and about 24 inches in height.

Aspect 13: The system of any of aspects 1 through 11, wherein the container is from about 8 inches in height, width and length to about 36 inches in height, width and length.

Aspect 14: The system of any of aspects 1 through 13, wherein the system operates at no more than about 180 degrees Fahrenheit.

Aspect 15: The system of any of aspects 1 through 14, wherein the system operates from about 140 to about 180 degrees Fahrenheit.

Aspect 16: The system of any of aspects 1 through 15 further comprising an insulating material wrapped around the motor and the hydraulic pump, wherein the insulating material comprises a sound absorption coefficient from about 0.3 to about 1.0.

Aspect 17: The system of any of aspects 1 through 16, further comprising a controller operably linked to the motor and the hydraulic pump and a coolant reservoir.

Aspect 18: The system of any of aspects 1 through 17 further comprising an inverter in operable connection to the motor through one or a plurality of cables or wires.

Aspect 19: A motor vehicle comprising a system, wherein the system comprises:

(e) a motor having an outside periphery and an interior;

(f) a hydraulic pump comprising a fluid inlet and a fluid outlet, each of the fluid inlet and fluid outlet in closed fluid communication with one or a plurality of fluid conduits, wherein one or plurality of conduits define a fluid circuit;

(g) a first coolant line defining a fluid pathway for coolant around the motor, wherein a first segment of the first coolant line is positioned along the outside periphery of the motor and a second segment of the first coolant line is positioned along the interior of the motor; and (h) a second coolant line operably connected to the first coolant line and defining a fluid pathway for coolant around the motor, wherein a first segment of the coolant line is positioned along the interior of the motor and a second segment of the second coolant line is positioned along the outside periphery of the motor, wherein the hydraulic pump and the motor are positioned proximate to or substantially proximate to each other; and wherein the motor is operably electronically connected to at least one cable that carries electricity from an electrical source to the motor.

Aspect 20: The motor vehicle of aspect 19, wherein the first or second coolant line or the combination thereof comprises at least one segment that runs along a longitudinal axis of the motor.

Aspect 21: The motor vehicle of aspect 19, wherein the first or second coolant line or the combination thereof comprises at least one segment that runs along a longitudinal axis of the hydraulic pump.

Aspect 22: The motor vehicle of any of aspects 19 through 21, wherein the system further comprises a container comprising at least one sidewall, a first bulkhead fitting, and a second bulkhead fitting, the container encompassing the motor and the hydraulic pump, and wherein the first and second coolant lines extend away from the motor and pump and are operably connected to coolant bulkhead fittings positioned within the at least one sidewall.

Aspect 23: The motor vehicle of aspect 22, wherein the container is a cylindrical or rectangular based prism, cuboid or parallelepiped and comprises one or a plurality of surfaces that define an interior volume.

Aspect 24: The motor vehicle of aspect 22, wherein the container is a rectangular based prism, cuboid or parallelepiped and comprises six surfaces defining an interior volume, wherein the two lateral surfaces are parallel sidewalls and at least one surface is movable, such that the movable surface allows access to and from the interior volume.

Aspect 25: The motor vehicle of aspect 24, wherein the movable surface is movable about at least one edge on the container, such that the movable surface moves radially downward or upward about the at least one edge.

Aspect 26: The motor vehicle of any of aspects 22 through 25, wherein the container comprises fiberglass, plastic, or metal.

Aspect 27: The motor vehicle of aspect 22, wherein the motor is cylindrically shaped and comprises an internal component, capable of rotating internally about a longitudinal axis of the motor, and wherein the first and/or second coolant lines are positioned parallel to the longitudinal axis of the motor along a line adjacent to a circumference of the motor.

Aspect 28: The motor vehicle of any of aspects 19 through 27, wherein the motor is cylindrically shaped with two oppositely facing sides, wherein the first and second coolant lines are proximate to one of the oppositely facing sides of the motor, and wherein the hydraulic pump is positioned adjacent to or substantially adjacent to the other oppositely facing sides.

Aspect 29: The motor vehicle of any of aspects 19 through 28, wherein the hydraulic pump is positioned physically adjacent to the motor but are free of operable contact.

Aspect 30: The motor vehicle of any of aspects 19 through 29, wherein the container is from about 12 inches in length, about 12 inches in width, and about 24 inches in height.

Aspect 31: The motor vehicle of any of aspects 19 through 29, wherein the container is from about 8 inches in height, width and length to about 36 inches in height, width and length.

Aspect 32: The motor vehicle of any of aspects 19 through 29, wherein the system operates at no more than about 220 degrees Fahrenheit.

Aspect 33: The motor vehicle of any of aspects 19 through 30, wherein the system operates from about 140 to about 220 degrees Fahrenheit.

Aspect 34: The motor vehicle of any of aspects 19 through 33, wherein the system further comprises an insulating material wrapping around the motor and the hydraulic pump, and wherein the insulating material comprises a sound absorption coefficient of from about 0.3 to about 1.0.

Aspect 35: The motor vehicle of any of aspects 19 through 34, wherein the system further comprises a controller operably linked to the motor and the hydraulic pump and a coolant reservoir.

Aspect 36: The motor vehicle of any of aspects 19 through 35, wherein the system further comprises an inverter in operable connection to the motor through one or a plurality of cables or wires.

Aspect 37: A method of operating the system of aspect 17 comprising:

(a) engaging the controller to circulate coolant within the first and second coolant lines.

Aspect 38: The method of aspect 37 further comprising:

(b) turning on the motor and/or hydraulic pump.

Aspect 39: A method of manufacturing the system of any of aspects 1 through 18 comprising affixing the first and second coolant lines to the motor.

Aspect 40: A method of manufacturing the motor vehicle of aspect 19 comprising installing the system into the motor vehicle.

What is claimed is:

1. A system comprising:

(a) a motor having an outside periphery and an interior;

(b) a hydraulic pump comprising a fluid inlet and a fluid outlet, each of the fluid inlet and fluid outlet in closed fluid communication with one or a plurality of fluid conduits, wherein the one or plurality of fluid conduits define a fluid circuit;

(c) a first coolant line defining a fluid pathway for coolant around the motor, wherein a first segment of the first coolant line is positioned along the outside periphery of the motor and a second segment of the first coolant line is positioned along the interior of the motor;

(d) a second coolant line operably connected to the first coolant line and defining the fluid pathway for coolant around the motor, wherein a first segment of the second coolant line is positioned along the interior of the motor and a second segment of the second coolant line is positioned along the outside periphery of the motor, and (e) a container comprising at least one sidewall, a first coolant bulkhead fitting, and a second coolant bulkhead fitting, the container encompassing the motor and the hydraulic pump, wherein the first and second coolant lines extend away from the motor and pump and are operably connected to the first and second coolant bulkhead fittings positioned within the at least one sidewall, (f) wherein the hydraulic pump and the motor are positioned proximate to each other, and wherein the motor is operably electronically connected to at least one cable that carries electricity from an electrical source to the motor.

2. The system of claim 1, wherein at least one of the first or second segments of the first or second coolant lines runs along a longitudinal axis of the motor.

3. The system of claim 1, wherein at least one of the first or second segments of the first or second coolant lines runs along a longitudinal axis of the hydraulic pump.

4. The system of claim 1, wherein the container is a cylindrical or rectangular based prism, cuboid, or parallelepiped and comprises one or a plurality of surfaces that define an interior volume.

5. The system of claim 4, wherein the container is a rectangular based prism, cuboid or parallelepiped and the plurality of surfaces comprises six surfaces, which define the interior volume, wherein the six surfaces is comprised of two lateral surfaces which are parallel sidewalls, and at least one surface of the six surfaces is movable, such that the at least one movable surface allows access to and from the interior volume.

6. The system of claim 5, wherein the movable surface is movable radially downward or upward about at least one edge on the container.

7. The system of claim 1, wherein the container comprises fiberglass, plastic, or metal.

8. The system of claim 1, wherein the motor is cylindrically shaped and comprises an internal component capable of rotating internally about a longitudinal axis of the motor, and wherein the first and/or second coolant lines are positioned parallel to the longitudinal axis of the motor along a line adjacent to a circumference of the motor.

9. The system of claim 1, wherein the motor is cylindrically shaped with two oppositely facing sides, wherein the first and second coolant lines are proximate to one of the oppositely facing sides of the motor, and wherein the hydraulic pump is positioned adjacent to or substantially adjacent to the other oppositely facing side.

10. The system of claim 1, wherein the hydraulic pump is positioned physically adjacent to the motor but the hydraulic pump is free of operable contact with the motor.

11. The system of claim 1, wherein the container is from about 12 inches in length, about 12 inches in width, and about 24 inches in height.

12. The system of claim 1, wherein the container is from about 8 inches in height, width and length to about 36 inches in height, width and length.

13. The system of claim 1, wherein the system operates at no more than about 180 degrees Fahrenheit.

14. The system of claim 1, wherein the system operates from about 140 to about 180 degrees Fahrenheit.

15. The system of claim 1, further comprising an insulating material wrapped around the motor and the hydraulic pump, wherein the insulating material comprises a sound absorption coefficient from about 0.3 to about 1.0.

16. The system of claim 1, further comprising a controller operably linked to the motor and the hydraulic pump and a coolant reservoir.

17. The system of claim 1, further comprising an inverter in operable connection to the motor through the at least cable.

18. A motor vehicle comprising a system, wherein the system comprises: (a) a motor having an outside periphery and an interior; (b) a hydraulic pump comprising a fluid inlet and a fluid outlet, each of the fluid inlet and fluid outlet in closed fluid communication with one or a plurality of fluid conduits, wherein the one or the plurality of conduits define a fluid circuit; (c) a first coolant line defining a fluid pathway for coolant around the motor, wherein a first segment of the first coolant line is positioned along the outside periphery of the motor and a second segment of the first coolant line is positioned along the interior of the motor; (d) a second coolant line operably connected to the first coolant line and defining the fluid pathway for coolant around the motor, wherein a first segment of the coolant line is positioned along the interior of the motor and a second segment of the second coolant line is positioned along the outside periphery of the motor; and (e) a container comprising at least one sidewall, a first coolant bulkhead fitting, and a second coolant bulkhead fitting, the container encompassing the motor and the hydraulic pump, wherein the first and second coolant lines extend away from the motor and pump and are operably connected to the first and second coolant bulkhead fittings positioned within the at least one sidewall, (f) wherein the hydraulic pump and the motor are positioned proximate to each other; and (g) wherein the motor is operably electronically connected to at least one cable that carries electricity from an electrical source to the motor.

19. The motor vehicle of claim 18, wherein at least one of the first or second segments of the first or second coolant lines runs along a longitudinal axis of the motor.

20. The motor vehicle of claim 18, wherein the motor vehicle is a garbage truck or a landscaping truck.

* * * * *